(12) United States Patent
Shen et al.

(10) Patent No.: US 8,006,519 B2
(45) Date of Patent: Aug. 30, 2011

(54) FIBERIZING BUSHING WITH DIFFERENT SIZE TIPS

(75) Inventors: ChangQing Shen, Lakewood, CO (US); Alessandro G. Borsa, Evergreen, CO (US); Terry Hanna, Millersport, OH (US)

(73) Assignee: Johns Manville, Denver, CO (US)

( * ) Notice: Subject to any disclaimer, the term of this patent is extended or adjusted under 35 U.S.C. 154(b) by 610 days.

(21) Appl. No.: 11/784,951

(22) Filed: Apr. 10, 2007

(65) Prior Publication Data

US 2008/0250818 A1   Oct. 16, 2008

(51) Int. Cl.
*C03B 37/08* (2006.01)
*C03B 37/083* (2006.01)

(52) U.S. Cl. ........... 65/495; 65/471; 65/496; 65/497; 65/498; 65/499

(58) Field of Classification Search .......... 65/471, 65/495–499
See application file for complete search history.

(56) References Cited

U.S. PATENT DOCUMENTS

| | | |
|---|---|---|
| 3,554,718 A * | 1/1971 | Stalego ............ 65/495 |
| 3,628,930 A | 12/1971 | Harris |
| 3,997,309 A | 12/1976 | Harris |
| 4,078,413 A | 3/1978 | McCormick et al. |
| 4,207,086 A | 6/1980 | Heitmann et al. |
| 4,337,075 A | 6/1982 | Mechel et al. |
| 4,348,217 A * | 9/1982 | Williamson et al. ...... 65/480 |
| 4,397,665 A | 8/1983 | Fatula, Jr. et al. |
| 4,488,891 A | 12/1984 | Grubka et al. |
| 4,594,087 A | 6/1986 | Kuhn |
| 4,612,027 A | 9/1986 | Marra |
| 4,624,693 A | 11/1986 | Marra et al. |
| 4,664,688 A | 5/1987 | Grubka et al. |
| 4,676,813 A | 6/1987 | Hanna et al. |
| 4,717,411 A | 1/1988 | Fowler |
| 4,740,224 A | 4/1988 | Fowler |
| 4,775,400 A | 10/1988 | Wright et al. |
| 5,051,121 A | 9/1991 | Grundy |
| 5,071,459 A | 12/1991 | Kuhn |
| 5,244,483 A | 9/1993 | Brosch et al. |
| 5,785,728 A | 7/1998 | Verrasso |
| 5,928,402 A | 7/1999 | Mirth et al. |
| 5,935,291 A | 8/1999 | Kim et al. |
| 6,177,656 B1 | 1/2001 | Varrasso et al. |
| 6,196,029 B1 | 3/2001 | Melia et al. |
| 6,408,654 B1 | 6/2002 | Boessneck et al. |
| 6,427,492 B1 | 8/2002 | Sullivan et al. |
| 6,453,702 B1 | 9/2002 | Hanna et al. |
| 6,701,754 B2 | 3/2004 | Sullivan et al. |
| 7,003,986 B2 | 2/2006 | Hanna |
| 7,194,875 B2 | 3/2007 | Arterburn |
| 7,269,974 B2 | 9/2007 | Anzai et al. |
| 2007/0101769 A1 | 5/2007 | Gu et al. |
| 2007/0227195 A1 | 10/2007 | Renaudin et al. |

* cited by examiner

*Primary Examiner* — Khanh Nguyen
*Assistant Examiner* — Carson Gross
(74) *Attorney, Agent, or Firm* — Robert D. Touslee

(57) ABSTRACT

Fiberizing bushings for fiberizing molten materials including molten glass are heated by applying a voltage drop across the bushings wherein molten material flows through an array of hollow tips attached to, or integral with, a tip plate having orifices therein that generally align with channels through the hollow tips to form fibers. The uniformity of the diameter of the fibers produced is much improved by using tips of different lengths and/or tips having channels of differing ID's to compensate for unequal electrical heating and/or cooling effects of drawn-in ambient air that cools the tips on the extreme outer periphery and/or cooling or heating effects of external supports or cooling members running through the array of tips that cools or heats adjacent tips more than the interior tips.

42 Claims, 8 Drawing Sheets

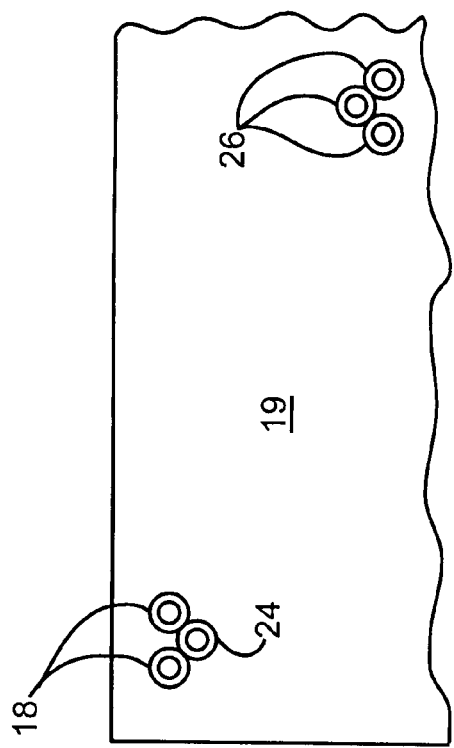
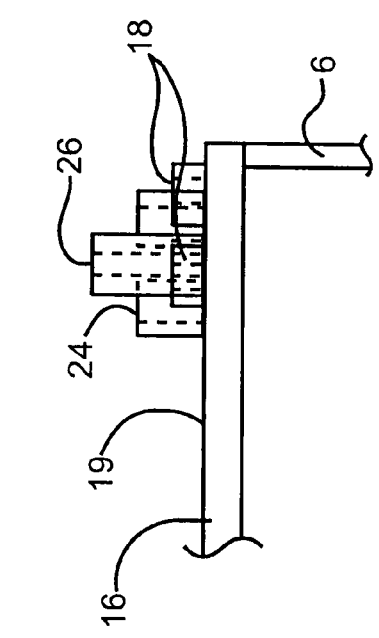
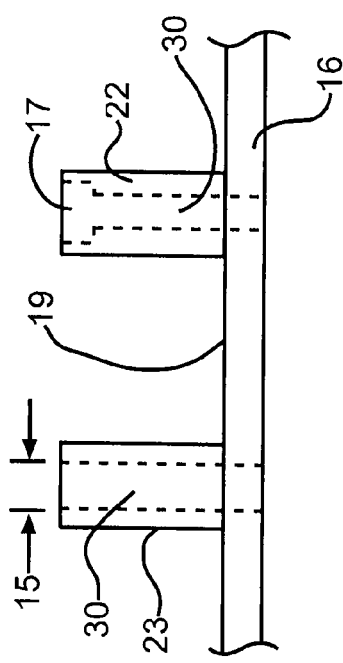

FIBERIZING BUSHING WITH DIFFERENT SIZE TIPS

The invention involves improved fiberizing bushings and methods for making fiber from molten materials including molten glass. More particularly, the present invention involves a system and methods for making fiber that provide a more uniform fiber diameter in the fibers made from a fiberizing bushing.

BACKGROUND

In the manufacture of fiber from molten material, it has been common practice to use electrically heated bushings made of precious metals including platinum, rhodium, palladium, ruthenium, iridium and alloys thereof. The bushings are electrically heated using the electrical resistance of the fiberizing bushings which are usually box-like, open on the top and comprise an orifice plate containing hundreds or thousands of orifices, with or without nozzles or tips welded or formed thereon, as shown by U.S. Pat. Nos. 4,207,086 and 4,078,413, which disclosures are hereby incorporated by reference.

In the manufacture of fiber from molten material, a fiberizing bushing is normally used such as those shown in U.S. Pat. Nos. 4,662,922, 5,935,291, 6,196,029, 6,408,654, 6,427,492, 6,453,702, 6,701,754 and 7,003,986, the disclosures of which are incorporated herein. By desired fiberization is meant that the bushing is operating making the desired fiber for the product being produced. To remove the heat from the meniscus and fiber that must be removed to cool the molten or plastic fiber so that it will have integrity and strength to endure the remainder of the process of making the fiber product, cooling members are located close to the orifices or nozzle tips. These cooling members can be either cooling tubes like shown in U.S. Pat. Nos. 3,628,930, 4,397,665, 5,244,483 and 6,196,029, the disclosures of which are hereby incorporated by reference, or cooling fins, sometimes called fin blades or fin shields, attached to a cooling manifold as are well known in the fiber industry.

To produce a fiber from a molten material, the molten material must be in a range of viscosity that will produce a fiber. If the viscosity of the material coming out of the tip is too high, stresses caused by attenuation in the meniscus will cause the fiber to break. If the viscosity of the molten material in the meniscus is too low, the surface tension forces in the meniscus trying to form a sphere from the molten material will break the fiber. Since the viscosity of the molten materials is always temperature dependent, it is extremely important that the temperature of the molten material exiting from all of the tips is safely within the fiberizing range. If the stress in the fiber at or near the bottom of the meniscus reaches a critical level, the fiber breaks.

When a fiber break occurs, the loose fiber soon causes other fibers to break and soon all, or most, fibers being formed beneath the bushing are broken, a stoppage of desired fiberization. This is called a "breakout" in the industry. After a breakout begins, it is necessary to wait a short time, usually tens of seconds up to a few minutes, for beads of molten glass to form beneath each bushing orifice or tip, and become large enough that they break loose and fall from the bottom of the orifice plate or tip pulling a very coarse fiber, called a primary fiber, onto the floor, into a scrap bin, basement or scrap bin beneath the forming room floor. This is normally called "beading out" in the industry and the "beading out" typically takes about 30-120 seconds. Once beaded out, or as soon as the operator is available, the operator or starting equipment can then restart a strand containing the primary fibers into a chopper or winder and again begin making the desired product.

When the bushing is running good product the fibers are moving away from the bottom of the bushing at a speed of thousands of feet per minute. This downward movement at this speed, of an array of hundreds or thousands of fibers, creates, due to friction between the air surrounding the fibers and the surface of the fibers, a partial vacuum (lower pressure zone) by pulling a stream of air downward. The partial vacuum causes a flow of cooling air from the surroundings into the array close to the orifice plate and tips of the bushing. This flow of inspirated air coming from outside the array of fibers cools the tips, meniscuses and the newly formed fibers somewhat. Much additional cooling is accomplished with the cooling members, cooling fins or cooling tubes, mounted beneath the bushing and close to the tips to cool the air tips and glass/fibers. The cooling of the bushing, tips and orifice plate, causes, with some delay, the temperature of the walls of the bushing to change or drop causing the power controller to send additional electrical power to the bushing automatically to maintain the set-point temperature. The method of controlling tip plate or orifice plate temperature, or bushing temperature, by using one or more temperature sensors located at one or more locations on the bushing walls performed satisfactorily on bushings of less than about 1600 tips and when other variables were less in control than today, but now with better control of parameters important to fiberization and particularly with much larger bushings of 6000 or more orifices and/or tips, better temperature control of the bushing orifice plate or tip plate and tips is needed, as indicated by the fiber diameter distribution of fiber product produced by both individual bushings and by a plurality of bushings.

When the bushing breaks out, this inspirated cooling flow of cooling air stops. At that time several more undesirable things begin. The set point thermocouple begins to heat up because of the loss of cooling air and as it does, the controller decreases the electrical power heating the bushing. As the electrical power is decreased during the beading out and hanging periods, the molten glass through-put decreases by 5-15 percent, slowing the flow of molten glass through the well, orifice, between the forehearth leg above the bushing and the bushing causing the temperature of the molten glass in the well, and thus the molten glass entering the bushing, to drop substantially, about 25-75 degrees F. This colder glass coming into the bushing causes the molten glass exiting the orifices to be colder and thus to have a higher viscosity. The higher viscosity glass has more resistance to attenuation when desired fiberization is restarted, causing higher stress in the fiber at its weakest point, and it frequently breaks. This is why the break rate is normally highest during the first ten minutes or longer after restart of desired fiberization, particularly as the area of the orifice/tip plate of the bushings has increased to accommodate mote orifices/tips. The larger the area of the orifice plate or tip plate, the greater the tendency to have a larger temperature variance across the orifice plate or tip plate or the tips. It normally takes about ten minutes or longer for the molten glass in, and exiting, the bushing to again reach the desired fiberizing temperature.

The above conditions apply to any molten material, but are most costly in the manufacture of so-called "continuous" glass fiber products from molten glass. In the manufacture of continuous glass fibers, melting furnaces are typically used to melt batch, refine the molten glass, and to feed molten glass through one or more forehearths and usually a plurality of bushing legs to the bushings. It is extremely important, to achieve a very low bushing breakout rate, that the molten glass coming to the bushings is fully melted and uniform in temperature and chemistry. Mixing in the molten glass is mainly dependent upon maintaining desired temperature gradients and flow patterns in the melting furnace. There are typically hundreds of thousands of pounds of molten glass, often about 500,000 pounds, in a typical melting furnace system for making continuous glass fibers. With this much molten material, the melting furnace and delivery system has great momentum and inertia, i.e. it is difficult and takes considerable time correct a change in the molten glass reaching the bushings following a furnace upset. A furnace upset is anything that makes a significant change in the way the melting furnace is operating, including a significant change in the throughput of molten glass through the delivery system, including the bushings. In the past it has been noticed that when a plurality of bushings were stopped from making desired fiber product and put into a hanging mode, to permit a chopper that had been pulling strands of fibers from the bushings to be rebuilt, that after a few minutes the conditions inside the melting furnace would change and that the automatic burner controls for the melter were changing conditions of the burners responding to the change(s) in the furnace. This happens on a smaller scale with every bushing breakout. This is necessary now, but not desirable. Although improvements in melting furnace control and stability have been made through the decades that large melting furnaces have existed, frequent furnace upsets or disturbances still exist result in lower productivity and higher manufacturing costs.

It is known that the end walls and sidewalls of electrically resistance heated fiberizing bushings made of a conductive material tend to be hotter in operation, causing the outer periphery of the tip plate of the bushing to also be hotter than the interior portion of the tip plate. Numerous modifications have been proposed and used to try to eliminate this problem, but it still exists even if at a lower temperature difference, particularly on bushings having about 2000 or more tips. Sometimes a generally center portion of the tip plate is also hotter during operation than the portions between the generally center portion and peripheral portion of the tip plate, being caused by hotter glass flowing into a center region of the bushing than the glass flowing into the regions surrounding the generally center region of the bushing.

It is also known to try to maintain a drawn-in cooling airflow into the tips and area beneath the bushing by starting a downward flow of high velocity air from an air tube mounted beneath the bushing as soon as a fiber breakout is detected. This helps, but does not fully compensate for the amount of air that is drawn-in during the desired fiberization operation. As a result the bushing heats up and the control system reduces the amount of power being passed through the bushing. Then when the bushing is restarted and the drawn-in air is once again flowing rapidly, fiber breaks often occur before the bushing can get back into desired fiberization equilibrium.

Attempts have been made to achieve uniform tip profiles across the tip plate of bushings by changing the sizes of holes in the bushing screen located above the tip plate. While this improves the uniformity, particularly of the molten glass reaching the tip plate, it is insufficient to overcome the problems of the peripheral tips breaking out much more often than the interior tips.

SUMMARY

Using infrared temperature sensors trained on individual tips it has now been discovered that the tips on the outer periphery of the array of tips on a bushing tip plate on some fiberizing bushings are significantly cooler than the tips on the interior of the of the array and that the coldest tips are on the tips on the extreme outer periphery of the tip plate of the bushing. The tips that have at least one half of a tip between them and the closest outer edge of the tip plate are significantly hotter than those that do not and the coldest tips are those on the corners of the tip plate. From this it has been concluded that this phenomena is being caused by the flow of ambient air pulled into the array of fibers, the air flow that has been recognized for a long while as being important to fiber cooling and necessary to try to maintain during breakouts to minimize fiber breaks after restarting fiberization of the bushing, but had not been recognized as a cause of fiber breaks on the peripheral tips of the bushing.

It has also been discovered that the tips on the outer periphery of the array of tips on a bushing tip plate on other fiberizing bushings are significantly hotter than the tips on the interior of the of the array and that the hottest tips are the tips on the extreme outer periphery and particularly on the tips at the ends of the tip plate. The tips that have at least one half of a tip between them and the closest outer edge of the tip plate are significantly hotter than those that do not and the coldest tips are those on the corners of the tip plate. From this it has been concluded that this phenomena is being caused by the end walls and side walls of the bushing, and also a peripheral band of the tip plate that doesn't contain tips, being heated to a higher temperature than the interior region of the tip plate by the resistance heating.

From this work followed work to determine the variation in the fiber diameter coming from state of the art bushings. It was discovered that, prior to this invention, the fiber diameter distribution from single state of the art bushings producing about 4400 fibers/bushing that the typical fiber diameters on 16 micron bushings vary by more than 10 microns, on 13 micron bushings the fiber diameter typically varies by more than 15 microns and 10 micron bushings the fiber diameter typically varies by up to about 10 microns. Bushings having more than about 4400 tips show this degree of fiber diameter variation or usually even a higher magnitude of variation. The smallest diameter fibers are the most likely to break most frequently causing a breakout in the bushings and it is now believed that this fiber diameter variation is the most important reason why 10 micron bushings breakout more frequently than 13 or 16 micron bushings. The smallest diameter fibers typically being produced from 10 micron bushings are about 5 microns or smaller and these fibers are the ones most affected by variations in operating conditions and therefore the fibers that break most frequently. An even worse situation exists with bushings producing even smaller average fiber diameter products than 10 microns, and a somewhat less serious, but still very costly, situation exists with bushings making larger diameter fibers like 13, 16 and larger diameter fibers. With such a wide variation in fiber diameters coming from typical operating bushings, improvement is needed in the bushings to substantially narrow the fiber diameter variation, particularly to increase the minimum fiber diameter produced by these bushings.

In addition to cooling members located beneath the bushing, the rapid movement of the array of fibers being pulled away from the bushing draw air along with the fibers creating a negative pressure near the tips of the bushing which in turn draws surrounding air into the tips and fiber being formed beneath the tips. This incoming relatively cool air cools the tips around the outside edges of the tip plate much more than the interior tips because heat given up by an outer peripheral band of tips heats up the drawn-in air. The cooler outside tips, and molten material therein, results in a lower flow rate of molten material through the cooler tips than through the hotter tips on the interior of the tip plate. Also, the molten material coming from the cooler peripheral tips results in cooler meniscuses at the outlets of the cooler peripheral tips. Since all of the fibers formed from the tips of the fiberizing bushing are pulled away from the meniscuses at the same pulling speed, the cooler meniscuses produce smaller diameter fibers than the hotter interior meniscuses, and due to the higher attenuation shear forces in the cooler meniscuses and the smaller resultant diameter fibers, these smaller diameter fibers tend to breakout much more frequently than the larger diameter fibers coming from the hotter meniscuses. Each fiber break soon causes the entire bushing to breakout, a costly production interruption.

With the drawn-in air, described above, causing more cooling on the outer peripheral band of tips causes problems of continuously achieving this condition and usually is the greatest cause of fiber breaks. If the quality of the molten material is satisfactory for fiberization, most of the fiber breaks are caused by one or more tips on the bushing plate being hotter, but usually colder, than desired for fiberization. A cold tip makes a smaller diameter fiber due to a lower flow rate of molten material through the cold tip. This lower flow rate causes the meniscus and initial fiber to undergo a greater attenuation rate and the greater attenuation rate, of the colder material creates more stress in the attenuation zone. The finer fiber in the attenuation zone also results in faster cooling in the attenuation zone that adds to the stress.

According to the invention, the uniformity of the diameters of the fibers produced by a fiberizing bushing is substantially improved by either significantly reducing, or significantly increasing, the resistance to flow in at least some of the peripheral tips on a tip plate of a fiberizing bushing compared to the resistance to flow in the interior tips. A peripheral tip is defined as a tip that has no more than 4-6 tips between it and the closest peripheral edge of the tip plate or bushing. An interior tip is defined as those tips having at least 4 tips or partial tips, an often more tips between it and a closest peripheral edge of the tip plate. An extreme peripheral tip or extreme outer peripheral tip is defined as a tip that has no more than one tip between it and the closest peripheral edge of the tip plate or bushing. By significantly reducing the resistance to flow in a tip is meant the glass flow through that tip is significantly increased so as to match or almost match the flow of the interior tips and in all cases to be within a range of flow rate compared to the average flow rate of the interior tips that the variation in the diameter of the fibers produced by the bushing is within the range of +/−5-7 microns, more typically within the range of +/−3-6 microns and most typically within the range of +/−2-4 microns. When it is not possible to match the flow rate of molten material through the peripheral tips with the flow rate through the interior tips, it is preferable to size the peripheral tips such that the flow rate either significantly exceeds the flow rate through the interior tips, or falls significantly short of the flow rate through the interior tips. The resistance to flow can be reduced by increasing the interior diameter of the tip, making the tip height (or length) shorter or both.

The invention comprises a fiberizing bushing comprising at least one wall and a tip plate having a plurality of tips thereon, the tips having a resistance to flow of the molten material and permitting the molten material to flow through a channel in the interior of each tip to form fibers, the tip plate comprising an array of tips comprising peripheral tips and interior tips, the improvement comprising that the resistance to flow of the molten material through at least some of the peripheral tips is significantly less than the resistance to flow of the molten material through at least most of the interior tips. The invention also comprises a fiberizing bushing comprising at least one wall and a tip plate having a plurality of tips thereon, the tips having a resistance to flow of the molten material and permitting the molten material to flow through a channel in the interior of each tip to form fibers, the tip plate comprising an array of tips comprising peripheral tips and interior tips, the improvement comprising that the resistance to flow of the molten material through at least some of the peripheral tips is significantly greater than the resistance to flow of the molten material through at least most of the interior tips.

To achieve a uniform flow rate through all of the tips on a tip plate according to the invention, the resistance to flow of at least some of the extreme outer peripheral tips, including all of the extreme outer peripheral tips, and optionally also at least some of the peripheral tips, including all of the peripheral tips, is made either significantly less, or significantly greater, than the resistance to flow of at least most of the interior tips. Optionally, the resistance to flow through the extreme outer peripheral tips is made so much lower that the flow rate through these tips is enough to make fibers having a diameter at least as great as the diameter of the fibers made from the interior tips and more typically great enough to make fibers having a diameter that is in the range of 101 percent to as much as about 130 percent, but more typically as much as about 120 percent and most typically as much as about 107 or 110 percent of the diameter of the fibers made from the interior tips. Also, optionally the resistance to flow through at least some of the peripheral tips, including all of the peripheral tips, is made so much lower that the flow rate through these tips is enough to make fibers having a diameter at least as great as the diameter of the fibers made from the interior tips.

The extreme outer peripheral tips are exposed to the full force of the drawn-in ambient cooling air and the peripheral tips are those tips in the outer periphery of the 35 array of tips that are partially shielded by one or more tips from the full force of the drawn-in cooling ambient air flow, but still receive the full force, or most of the full force, of that cooling air on a portion of the tip. By shielded peripheral tips is meant tips in an outer peripheral band of tips about one half inch to about one inch band behind the extreme outer peripheral tips. The tips are hollow, having a channel running down through the interior of each tip, usually aligned with an axial centerline of each tip. The resistance to flow of the molten material through the hollow tips can be changed by changing the distance the tips extend, protrude, beneath the bottom, exterior, surface of the tip plate, i.e. changing the length of the channel in by changing the interior diameter (ID) of the tips, or by a combination of length and ID. The resistance to flow can also be changed by counterboring, the appropriate holes, orifices, partway through the tip plate itself from either the top surface of the tip plate, the counter bore being of a larger diameter than the remainder of the orifices in the tip plate, but this method of changing the resistance to flow is less desirable because it both weakens the tip plate to creep or sag and affects the resistance heating of the tip plate.

The invention also comprises a method of making fibers from a molten material comprising flowing molten material into a fiberizing bushing, the fiberizing bushing comprising at least one wall and a tip plate having a plurality of tips thereon, the tips having a resistance to flow of the molten material and permitting the molten material to flow through a channel in the interior of each tip to form fibers, the tip plate comprising an array of tips comprising peripheral tips and interior tips, and pulling fibers away from the tips at a high rate of speed sufficient to form fibers having the desired fiber diameter; the improvement comprising that the resistance to flow of the molten material through the peripheral tips is significantly less than the resistance to flow of the molten material through the interior tips. Most typically the molten material will be molten glass of all kinds, most typically those glasses categorized as E glasses, but other materials including slags, inorganic salts, metals, basalt, metal oxides, polymers and mixtures thereof can also be fiberized with the invention.

Typically, bushings have one or more external supports for the tip plate and/or one or more cooling members for cooling the tips and the molten glass flowing from the tips to form fibers. These external supports and cooling members, or blank, tipless, spaces on the tip plates adjacent to the external supports and/or the cooling members also cause tips adjacent to the tipless spaces to be either heated or cooled more than the interior tips not adjacent to the tipless spaces. The invention also includes bushings having either different length tips and/or tips having different ID's adjacent to, and sometimes near, these tipless spaces than the lengths and/or ID's of interior tips that are not adjacent to, and near the tipless spaces. The tips are hollow, having a channel running through the length of the tip and generally aligned with the axis of the tip and also generally aligned with the axis of an orifice in the tip plate. By generally aligned means within the conventional tolerances typically experienced in the bushing fabrication art.

The invention is useful for fiberizing all kinds of molten materials and is particularly suitable for fiberizing inorganic materials including all kinds of glasses and glassy materials including glassy materials having steep viscosity/temperature curves and narrow fiberizing temperature ranges such as basalt and some metals. Some of the glasses most commonly fiberized is E glass, S glass, R glass and T glass, all of which are known.

The practice of the invention accomplishes much more than improving the performance of the bushing the invention is being used on. When all or most of the bushings on a melting furnace system are operated in the above manner, i.e. having substantially constant molten material throughput, the stability of the melting furnace, i.e. equilibrium, will be much improved, the quality, uniformity, of the molten glass reaching the bushings will be much improved, and the breakout rate of all the bushings will be substantially reduced. By "many of the bushings" is meant at least 25 percent of the operating bushings on the melting furnace system. The more bushings that are operated according to the invention on a melting furnace system, the more stable the melting furnace will become and the more improvement in break rate and cost. This will substantially increase the product productivity of the melting furnace system and substantially reduce the cost of every pound of fiber product produced according to the invention.

The present invention is applicable to any system or bushing that converts molten material to continuous fibers and particularly to systems and bushings that operate at temperatures above 1000 degrees F., more typically above 1200 degrees F. The invention is particularly useful in making continuous glass fibers and products made using such fibers. While the invention is applicable to any glass used to make fibers, E glass is the most common glass used to make continuous fiber.

When the word "about" is used herein it is meant that the amount or condition it modifies can vary some beyond that stated so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept, the objectives of the invention and embodiments disclosed, including the best mode known to the inventor, the inventor and others can, without inventive effort, explore beyond the limits disclosed using only ordinary skill to determine if the invention is realized beyond those limits, and when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 4 is a partial front view of a tip plate with some tips according to one embodiment of the invention.

FIG. 5 is a partial bottom view of a tip plate containing some tips according to another embodiment of the invention.

FIG. 6 is a partial front view of a tip plate showing a normal tip and a counter-bored tip.

DETAILED DESCRIPTION

Figures 1, 2:
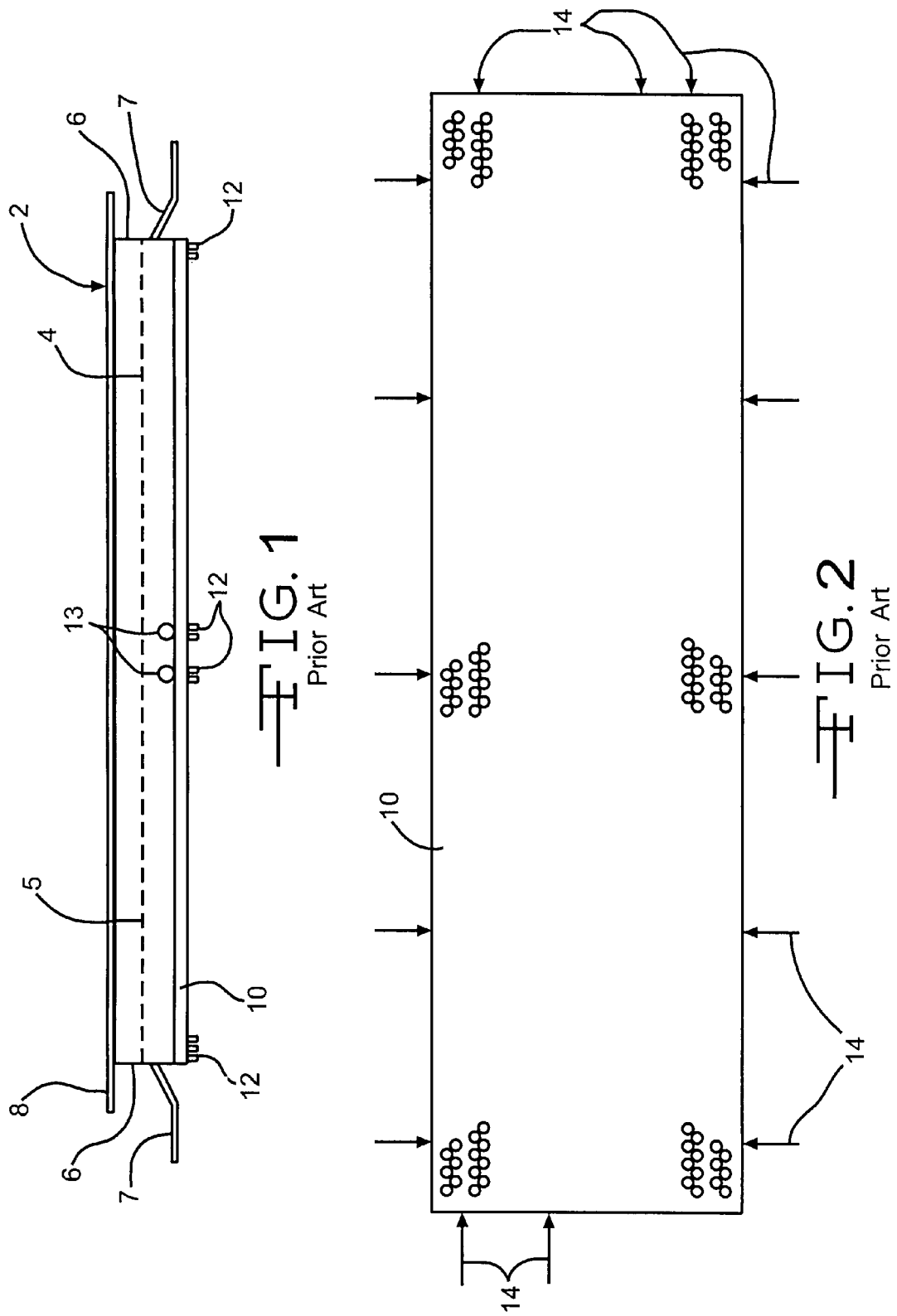
FIG. 1 is a front view of a typical prior art bushing showing temperature sensing members mounted on a sidewall of the bushing.
FIG. 2 is a bottom view of a typical tip plate of a bushing and showing how ambient air is drawn into the array of tips on the bushing.

FIG. 1 is a front view of a typical prior art precious metal fiberizing bushing 2 This typical prior art bushing 2 is typically made from a platinum/rhodium alloy having a rhodium content ranging from about 10-30 percent, typically 20-25 percent and is encompassed in a conventional mounting frame (not shown) for mounting on the bottom side of a forehearth or leg of a furnace in a conventional manner. Details of a typical bushing mount can be found in U.S. Pat. No. 3,997,309, incorporated herein by reference.

The bushing 2 comprises conventional sidewalls 4, end walls 6 and an electrical terminal ear 7 attached to each end wall 6. The bushing 2 also comprises a tip plate 10 having a plurality of tips, nozzles, 12 welded to or formed from the tip plate 10. The tips 12 can be arranged in rows down the length of the tip plate 10, or in rows across the width of the tip plate 10. In the bushing shown in FIG. 1, the tips 12 are arranged in pairs of rows staggered, running along the length of the bushing in a known manner, e.g. as shown in U.S. Pat. No. 4,337, 075. This configuration has been used to make glass fiber since at least the early 1970's. The tip plate 10 can be replaced with just an orifice plate without tips surrounding orifices in the orifice plate. The bushing 2 is electrically heated by connecting the terminal ears 7 to an electrical input in a conventional manner. The magnitude of electrical power to the ears 7 is normally controlled by a controller (not shown) that receives input from one or more thermocouples 13 attached to, or located very close to a sidewall 4. The bushing has a flange 8 surrounding the top of the sidewalls and end walls to seal against the bottom of the bushing leg or forehearth in a known manner. The bushing 2 also typically contains a conventional screen 5 having a plurality of holes therein for the purposes of catching any large pieces of refractory in the molten glass, for providing a mixing function and optionally for controlling the flow of molten glass to the tip plate 10 in such a way as to produce a more uniform glass temperature reaching all of the tip plate 10.

Examples of electrical ear configurations are shown in U.S. Pat. Nos. 7,003,986, 4,717,411 and 4,740,224, the disclosures of which are incorporated herein by reference. There are also many types of terminal clamps used to connect the electrical power source to the electrical ears of the bushings and some types are shown in the U.S. Pat. Nos. 4,717,411 and 7,003,986. Any reasonable electrical ear configuration and type of terminal clamps used on bushings can be used in the present system of the invention. Also, the bushings shown and discussed have the electrical ears attached to or integral with the end walls of the bushing in which cases the length of the bushing is the longest dimension, i.e. longer than the width of the bushing, but this is not necessary in the invention. It is also known to attach the electrical ears to the sidewalls of the bushing and that configuration is also suitable in the invention.

FIG. 2 is a bottom view of a typical prior art tip plate 10 showing the array of tips 12, normally in pairs of rows along the length or width of the bushing such as the bushing shown in FIG. 1. Whereas the pairs of rows of tips 12 in this view run parallel to the length of the tip plate 10, the pairs of rows of tips can also run perpendicular to the length of the tip plate, i.e. parallel with the width dimension. Also, the tips need not be in pairs of rows, but can be in any pattern commensurate with the tip cooling means used as is known. The bushing 2, when used to make fibers from molten glass or any material having a fiberizing temperature above about 1000 degrees F., is normally made from a precious metal alloy, normally alloys made from platinum and rhodium. Typical alloys for bushing use have a platinum content of about 95 to about 65 wt. percent and a rhodium content of about 5 to about 35 wt. percent, more typically 85-75 Pt/15-25 Rh and most typically 75-80 Pt/20-25 Rh. The tips 12 can be tubes having a thin sidewall soldered to the tip plate 10 so that the channel through the tip aligns with an orifice in the tip plate 10, or the tips 12 can be formed from and integral with the tip plate 10. In the latter case the outside of the tips 12 are typically tapered becoming larger towards the bottom of the tip plate 10 while the interior diameter of the channel through the tip remains constant, or is counter-bored to have an enlarged I.D. in an exit portion as is well known.

When the bushing 2 is in a fiberization mode, the fibers are moving away from the bottom of the tip plate 10 at a speed of thousands of feet per minute. This downward movement at this speed, of an array of hundreds or thousands of fibers, creates, due to friction between the air surrounding the fibers and the surface of the fibers, a partial vacuum (lower pressure zone) by pulling a stream of air downward. This partial vacuum causes a flow of cooling air 14 from the surroundings into the array of fibers, of meniscuses and tips 12 close to the orifice plate 10 of the bushing 2. This flow of inspirated cooling air 14 coming from outside the array of fibers cools the tips 12, meniscuses and the newly formed fibers somewhat. Conditioned air cooled to a range of about 40 to about 60 degrees F. is ducted into the area close to the bushings, as is common practice, and this cooled air makes up a large portion of the drawn-in cooling air 14.

Figure 3:
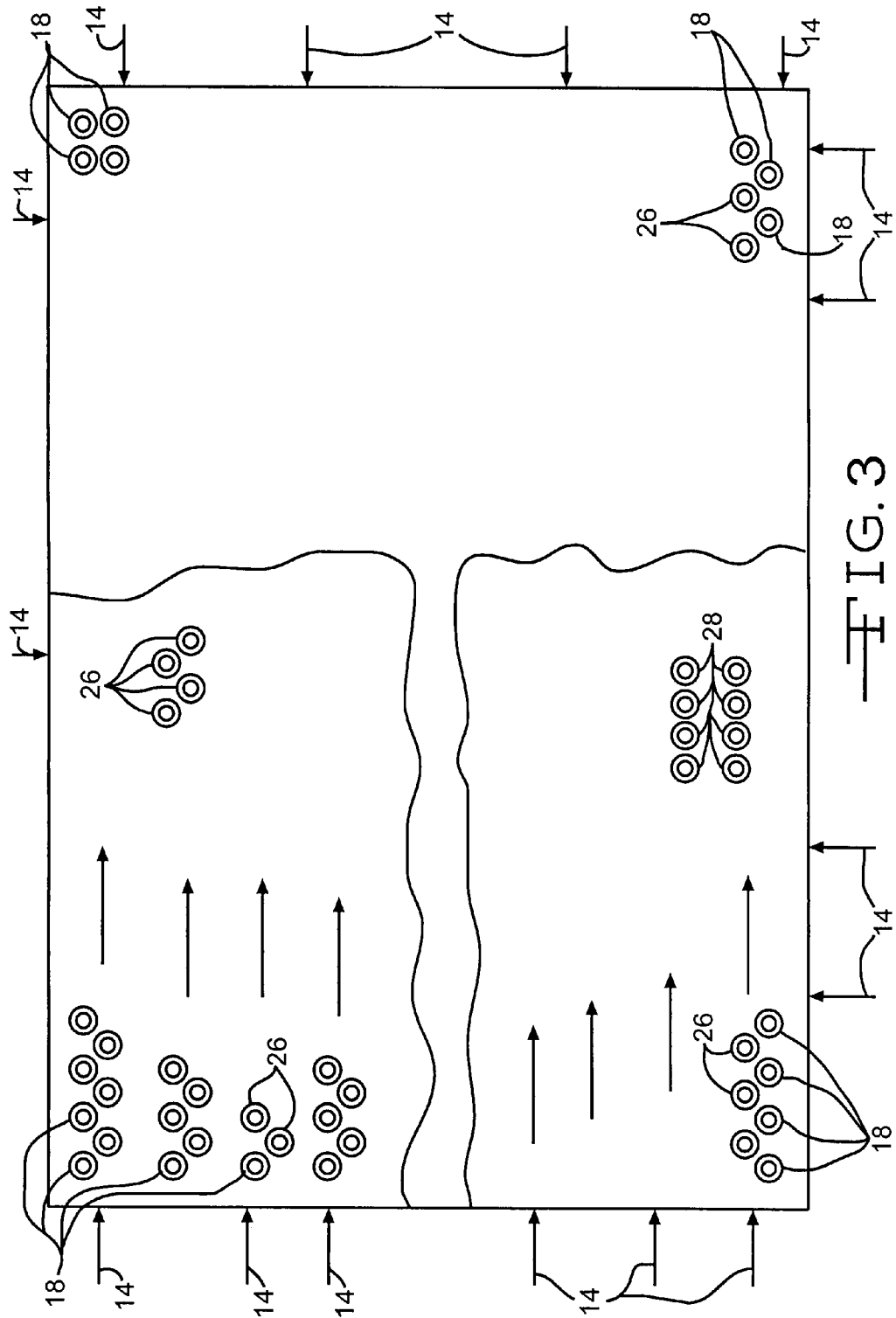
FIG. 3 is a partial bottom view of a tip plate showing various kinds of peripheral tips and interior tips.

It has been found, by measuring individual tip temperatures, that the extreme outer peripheral tips 18 (see FIG. 3) are cooled most, and substantially more than interior tips 26, and that peripheral tips 24 are also cooled more than are the interior tips 26, but less than the extreme outer peripheral tips 18. This different cooling effect is probably because the extreme outer peripheral tips 18 are exposed to the full force of the drawn-in cooling air 14, whereas the peripheral tips 24 are partially protected by one or more extreme outer peripheral tips 18 and also the drawn-in cooling air has been heated up somewhat by contact with at least one extreme outer peripheral tip 18. Finally, interior tips 26 are cooled the least by the drawn-in cooling air because this air has been heated up substantially by the time the cooling air flow reaches the interior tips 26 and because the interior tips are surrounded by, and partially protected by, hot tips, some or many or all of which are also interior tips 26 depending upon the exact location of the interior tip 26 in question.

In the past all of the tips 12 on a bushing were made to the same height and having the same interior diameter, see 15 in FIG. 6. Sometimes the tips 12 were counter-bored to form a larger ID in an end portion 17 of the tip 12, but all of the tips 12 were still the same. Since the drawn-in cooling air 14 cooled the extreme outer peripheral tips 18 more than the interior tips 26, the flow rate of the molten material through the extreme outer peripheral tips 18, even if at the same temperature as the molten material entering the interior tips 26, would be cooled more and thus the flow rate of molten material through the extreme outer peripheral tips 18 is less than the flow rate of molten material through the interior tips 26. This is an undesirable situation because since the fibers are being pulled away from the tip plate 16 at the same speed, fibers having a smaller diameter are produced by the extreme outer peripheral tips 18 than the fibers produced from the interior tips 26. Also, the fibers produced from the peripheral tips 24 will also have a smaller diameter than the fibers produced by the interior tips 24, but somewhat larger than the diameter of the fibers produced by the extreme outer peripheral tips 18. This is an undesirable situation, particularly since this condition is made worse by the fact that the meniscuses beneath the extreme outer peripheral tips 18 will also be cooled more than the meniscuses beneath the peripheral tips 24 and much more than the meniscuses beneath the interior tips 26. Finally, shielded peripheral tips 28 are tips in an outer peripheral about one half inch or about one inch band other than the extreme outer peripheral tips and peripheral tips. Shielded peripheral tips 28 are tips that although either almost entirely shielded or even fully shielded by one or more other tips, still are cooled more than the interior tips 26 such that the diameter of the fibers coming from these shielded peripheral tips, unless these tips are modified according to the invention, will have undesirably small fiber diameters, i.e. fiber diameters less than the diameters of the fibers produced by the interior tips 26 and by an amount that is undesirable. According to the invention, when that situation exists, the shielded peripheral tips are modified by slightly reducing the resistivity of the shielded peripheral tips.

Because of this cooling differential, it is most typically desirable to design the tips such that the flow rates of molten material are the same or nearly the same through all of the tips on a tip plate of a fiberizing bushing and operating in a fiberization mode. However, it may be very difficult and too costly to always achieve this most desirable result. Nevertheless, bushings can be achieved according to the invention having nearly the same molten material flow rate through all of the operating tips in the array of tips. By nearly the same is meant that the flow rate of the molten material through all of the operating tips is sufficiently uniform that the fiber diameters of the fibers produced by the bushing does not vary more than +/−5-7 microns, more typically +/−3-6 microns and most typically +/−2-5 microns, at any point in time of normal operation, and also includes conditions in which the molten material flow rate of the extreme outer tips 18 and the peripheral tips 24 is at least as great as the flow rate through most of the interior tips 26, and up to about 50-70, more typically up to about 30-50, and most typically up to about 10-30 percent greater, or smaller, at least in the extreme outer peripheral tips 18. Referring to FIG. 6, the flow rate through a tip is dependent upon the height, the ID or both, of the channel 30. The flow rate through a counter-bored tip 22 having an ID of the channel 30 the same magnitude as the ID of the channel 30 in the normal tip 23 will be greater than through that of the normal tip 23 because the height of the channel 30 in the counter-bored tip 22 is less than the height of the channel 30 in the normal tip 23. This is well known and controlled by the formulas for the flow rate of a liquid through a nozzle. Although the tips shown in FIGS. 4 and 6 have a straight wall, i.e. are tubular, tips are also known that are integral with the tip plate 16 and those tips usually have a slightly larger OD at the place they join the tip plate 16 than their OD at the end of the tip and these kind of tips are also included in the invention. Also, instead of tubular tips having a round cross section, tips having various polygonal shapes in cross section are also known and are also suitable for use in the invention.

To achieve a uniform flow rate through all of the tips on a tip plate according to the invention, the resistance to flow of at least the extreme outer peripheral tips 18, and optionally also peripheral tips 24, is made less than the resistance to flow of the interior tips 26. Optionally, the resistance to flow through the extreme outer peripheral tips 18 is made so much lower that the flow rate through these tips is enough to make fibers having a diameter at least as great as the diameter of the fibers made from the interior tips 26 and more typically great enough to make fibers having a diameter that is in the range of described above compared to the diameter of the fibers made from the interior tips 26. Also, optionally, the resistance to flow through the peripheral tips 24 is made so much lower that the flow rate through these tips is enough to make fibers having a diameter at least as great as the diameter of the fibers made from the interior tips.

FIG. 4 shows a partial front view of an inverted tip plate 16 containing tips of differing heights, i.e. protruding differing amounts from a bottom surface 19 of the tip plate 16 according to the invention to adjust the resistance to flow of the molten material through the various tips. The extreme outer peripheral tips 18 are substantially shorter, extend for a shorter distance above the bottom of the tip plate 16 than the interior tips 26. The peripheral tips 24 are shorter than the interior tips 26, but longer than the extreme outer peripheral tips 18. The length of the tips, amount they project from the bottom of the tip plate, or the length they extend from the top (interior) surface of the tip plate, are such as to achieve the fiber diameter uniformity recited above. The resistance to flow can also be changed by changing the interior diameter of the tips, i.e. the diameter of the channels 30 through the tips, and/or the diameter of the holes in the tip plate that the tips enter into and/or are welded to.

FIG. 5 shows an embodiment using this technique. The ID of the extreme outer peripheral tips 18 is substantially larger than the ID of the interior tips 26 and somewhat larger than the ID of the peripheral tips 24. Some bushings in a fiber forming operation might be partially shielded by some external part of the fiber forming system such that all of the extreme outer peripheral tips 18 and/or all of the peripheral tips 24 do not receive the same excessive cooling effects of the drawn-in cooling ambient air flow 14. In those cases, according to the invention, not all of the extreme outer peripheral tips 18 need have the same resistance to flow of molten material, but instead have a resistance to flow of molten material, when the bushing is in a fiberization mode, such that the fiber diameters of the fibers coming from the bushing do not vary more than amount of percent described above from the nominal fiber diameter desired, e.g. 10, 13, 16 microns or some other desired nominal diameter, or the average actual diameter of the fibers produced by the interior tips.

FIGS. 7-10 show typical embodiments of the invention to be used in differing types of bushings and different operating conditions and are explained in more detail in the following examples.

EXAMPLE 1

Figure 7:
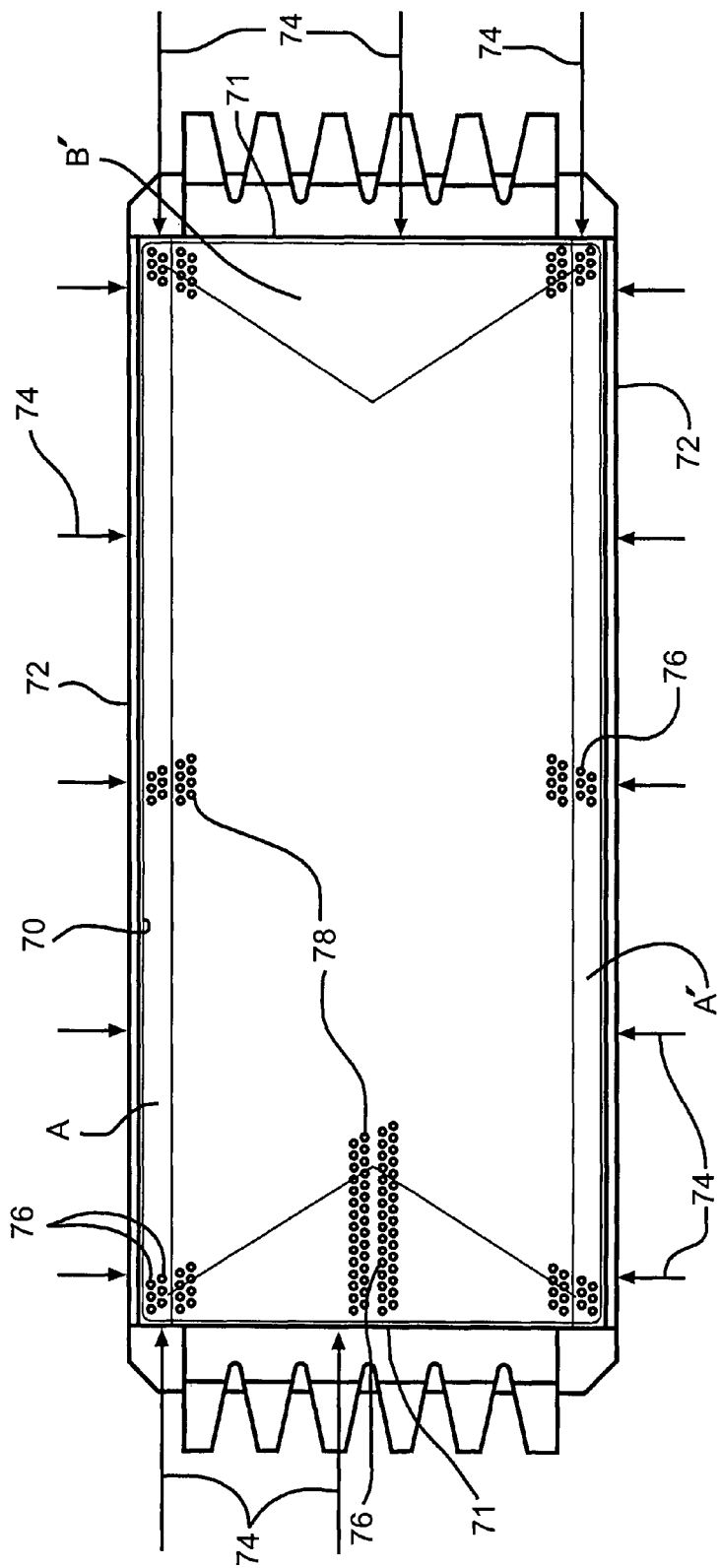
FIG. 7 is a bottom view of an embodiment of a tip plate according to the invention.

FIG. 7 shows the bottom of a tip plate 70, about 24 inches long by about 9 inches wide, of a bushing containing about 5200 tips 76 running in 17 paired or double rows of tips 76,78 parallel to the longest edges of the tip plate. Each pair of rows of tips 76,78 are spaced from each adjacent pair of rows of tips 76,78 or an edge 72 of the tip plate 70, the former spacing to allow for a conventional cooling fin attached to a conventional cooling tube (not shown). The tips 76 on each end 71 of the tip plate 70 are also spaced a conventional distance from the ends 71. The drawn in cooling air flow is shown as arrows 74. This bushing tip plate addresses the operating condition where the tips 76 in an outer periphery of the bushing run hotter than at least most of the interior tips 78. Since the electrical power for heating the bushing in FIG. 7 is conventionally fed to end walls of the bushing that attach the ends 71 of the tip plate, the end portions B, B' run hotter further into the array of tips, particularly towards a longitudinal center line of the tip plate 70 than around the remainder of the periphery including portions A, A' along the longitudinal edges 72 of the tip plate. The tips 76 in regions A, A', B and B' have a smaller interior diameter (ID), e.g. in the range of about 0.064 to about 0.054 inch, depending upon the diameter of the fiber being produced with the largest ID being for a tip plate making 16 micron fiber and the smallest ID being for a tip plate for making 10 micron fiber, than the about 0.072 inch (16 micron tip plate) to about 0.062 inch (10 micron tip plate) ID of the interior tips 78. The bushing of this example is designed to reduce the fiber diameter variation under normal operating conditions to about +/−5-7 microns from the average fiber diameter coming from the bushing.

EXAMPLE 2

This bushing tip plate is the same as shown in FIG. 7 and described in Example 1 except that while the tips 76 in regions A, A', B and B' have the same ID as the interior tips 78, but are up to about 50-70 percent longer than those tips to increase the resistance to flow through the tips 76 such that the variation under normal operating conditions is reduced to no more than about +/−5-7 microns from the average fiber diameter coming from the bushing. The specific ID of the tips 76 and 78 are dependent upon what nominal fiber diameter product is being made as explained in Example 1 above.

EXAMPLE 3

This bushing tip plate is the same as shown in FIG. 7 and described in Example 1 except that the tips 76 in regions A, A', B and B' a smaller ID (0.059-0.069 inch) than the interior tips 78 and are also about 30-50 percent longer than those tips to increase the resistance to flow through the tips 76 such that the variation under normal operating conditions is reduced to no more than about +/−3-6 microns from the average fiber diameter coming from the bushing. The specific ID and lengths of the tips 76 and 78 are dependent upon what nominal fiber diameter product is being made as explained in Example 1 above.

EXAMPLE 4

Figure 8:
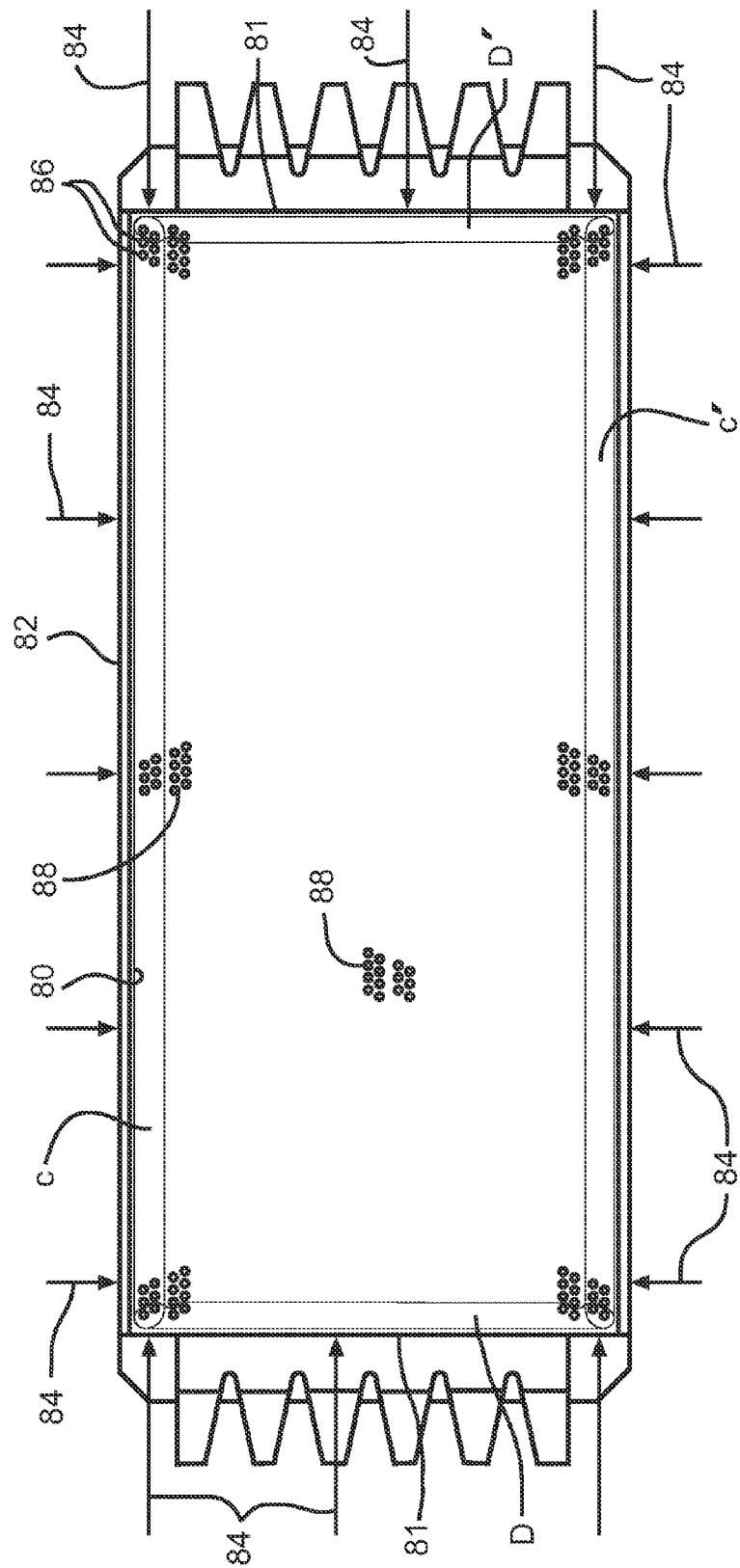
FIG. 8 is a bottom view of another embodiment of a tip plate according to the invention.

FIG. 8 shows the bottom of a tip plate 80, about 24 inches long by about 9 inches wide, of a bushing containing about 5200 tips 86 running in 17 paired or double rows of tips 86,88 parallel to the longest edges of the tip plate. Each pair of rows of tips 86,88 are spaced from each adjacent pair of rows of tips 76,78 or an edge 72 of the tip plate 70, the former spacing to allow for a conventional cooling fin attached to a conventional cooling tube (not shown). The tips 86 on each end 81 of the tip plate 80 are also spaced a conventional distance from the ends 81. The drawn in cooling air flow is shown as arrows 84. This bushing tip plate addresses the operating condition where the tips 86 in an outer periphery of the bushing run colder than at least most of the interior tips 88. In this bushing the operating conditions are such that the drawn-in cooling air flow 84 more than offsets the affects of the electrical power for heating the bushing in FIG. 8 is conventionally fed to end walls of the bushing that attach to the ends 81 of the tip plate 80, such that the tips 86 in the peripheral portions C, C', D and D' of the tip plate 80 run colder than the tips 88 further into the array of tips. The tips 86 in regions C, C', D and D' have a larger ID, e.g. in the range of about 0.004 to about 0.008 inch, depending upon the diameter of the fiber being produced with the largest ID being for a tip plate making 16 micron fiber and the smallest ID being for a tip plate for making 10 micron fiber, than the ID of the interior tips 78. The bushing of this example is designed to reduce the fiber diameter variation under normal operating conditions to about +/−5-7 microns from nominal.

EXAMPLE 5

Figure 9:
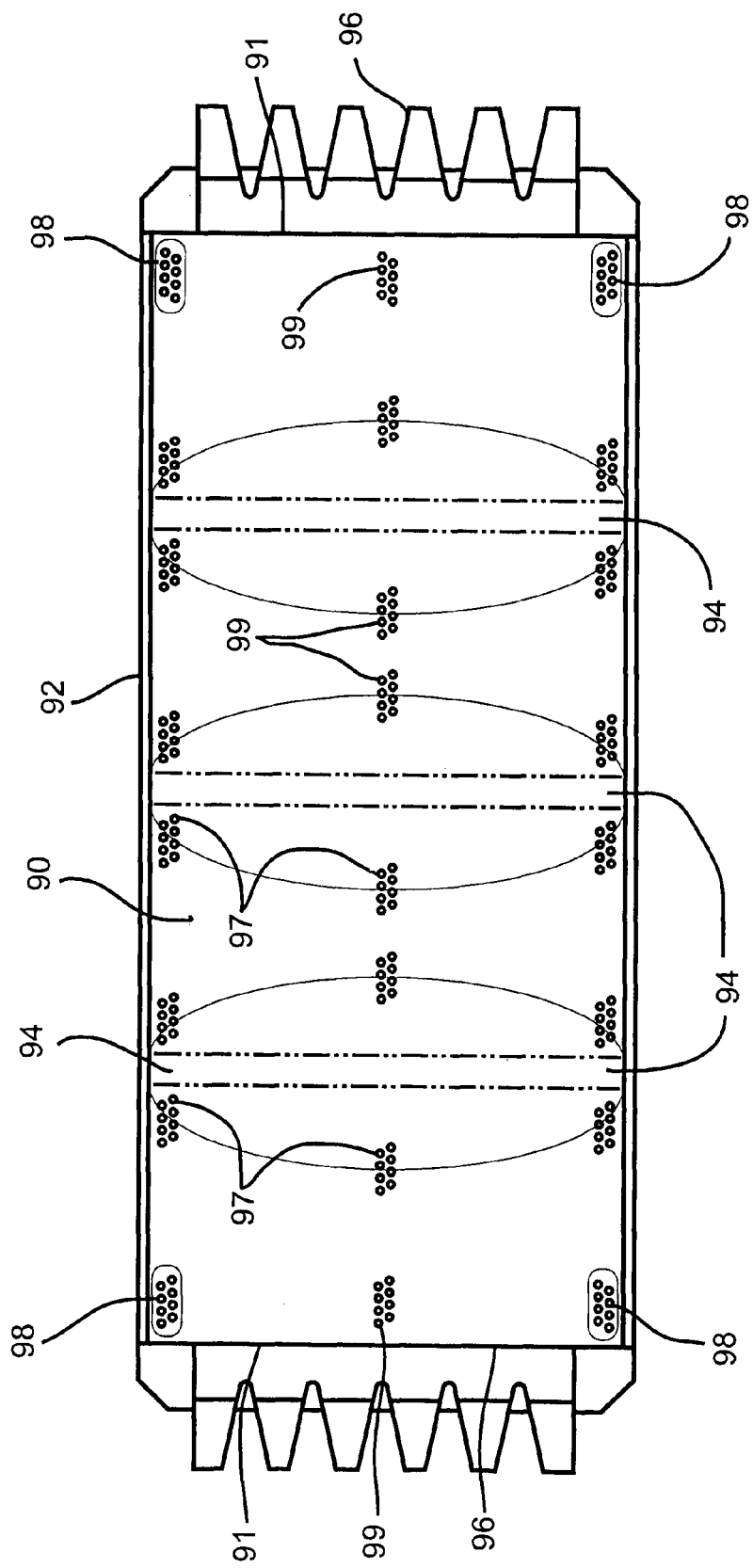
FIG. 9 is a bottom view of still another embodiment of a tip plate according to the invention.

FIG. 9 shows a bottom of a tip plate 90 of a 4000 tip bushing having lengthwise edges 92 and end edges 91. Terminal ears 96, that can be used on all the bushings disclosed herein, are for connecting conventional power clamps for feeding electrical power to the bushing for heating the bushing in a conventional manner. This tip plate has tipless strips 94 running parallel to and spaced from the edges 91 to provide space for conventional external tip plate supports (not shown) that cause the tips 97 adjacent to the strips 94 to run cooler than interior tips 99 due to the cooler external supports and the drawn-in cooling air. The diameter of the tips 97 have an ID in the range of about 0.032 to 0.007 inch greater than the ID of tips 99. This bushing also tends to have cooler corner regions so the tips 98 in the corner regions also have greater ID of about 0.032 to 0.007 inch than the interior tips 99. The bushing of this example is designed to reduce the fiber diameter variation under normal operating conditions to at least about about +/−5-7 microns, and more typically to at least about +/−3-6 microns from nominal.

EXAMPLE 6

Figure 10:
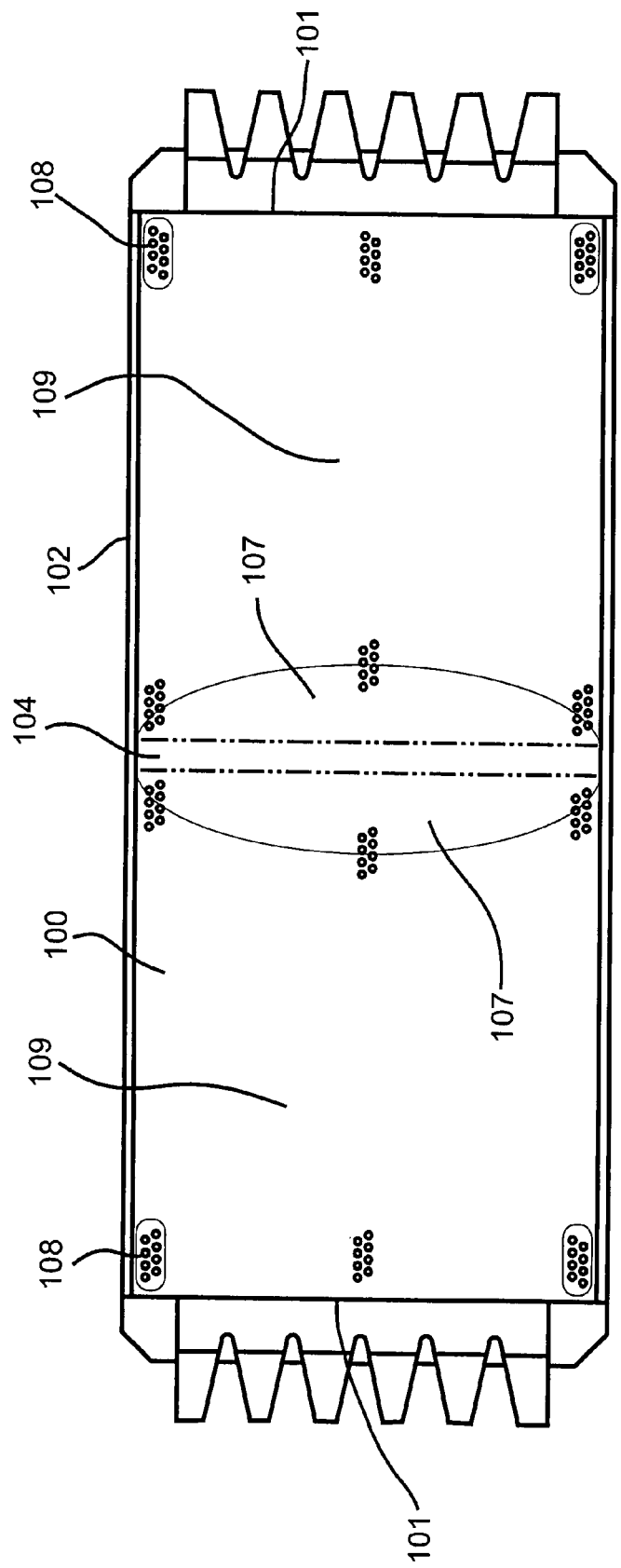
FIG. 10 is a bottom view of still another embodiment of a tip plate according to the invention.

FIG. 10 shows a bottom of a tip plate 100 of a 4000 tip bushing having lengthwise edges 102 and end edges 101. This tip plate has a tipless strip 104 running parallel to and spaced from the edges 101 to provide space for a conventional external tip plate support (not shown) that cause the tips 107 adjacent to the strip 104 to run cooler than interior tips 109 due to the cooler external support and the drawn-in cooling air. The tips 107 have larger ID's than interior tips 109 which have an ID of about 0.078 inch for making 16 micron fiber. The diameter of the tips 107 have an ID in the range of about 0.007 to about 0.032 inch greater than the ID of tips 109. This bushing also tends to have cooler corner regions so the tips 108 in the corner regions also have greater ID of about 0.007 to about 0.032 inch than the interior tips 109. The bushing of this example is designed to reduce the fiber diameter variation under normal operating conditions to less than about +/−5-7 microns, more typically to less than about +/−3-6 microns and most typically to about +/−2-4 microns from nominal.

The bushings of the above examples have tips running in rows that are parallel to the longest dimension of the tip plate of the bushing, but it is also common to run the rows of the tips parallel to the shortest dimension of the tip plate and the invention is applicable to these bushings as well as to bushings having tip plates of any shape with the rows of tips running in any direction. The following example shows an application of the invention to a bushing that has pairs of rows of tips running parallel to the shortest dimension of the tip plate.

EXAMPLE 7

Figure 11:
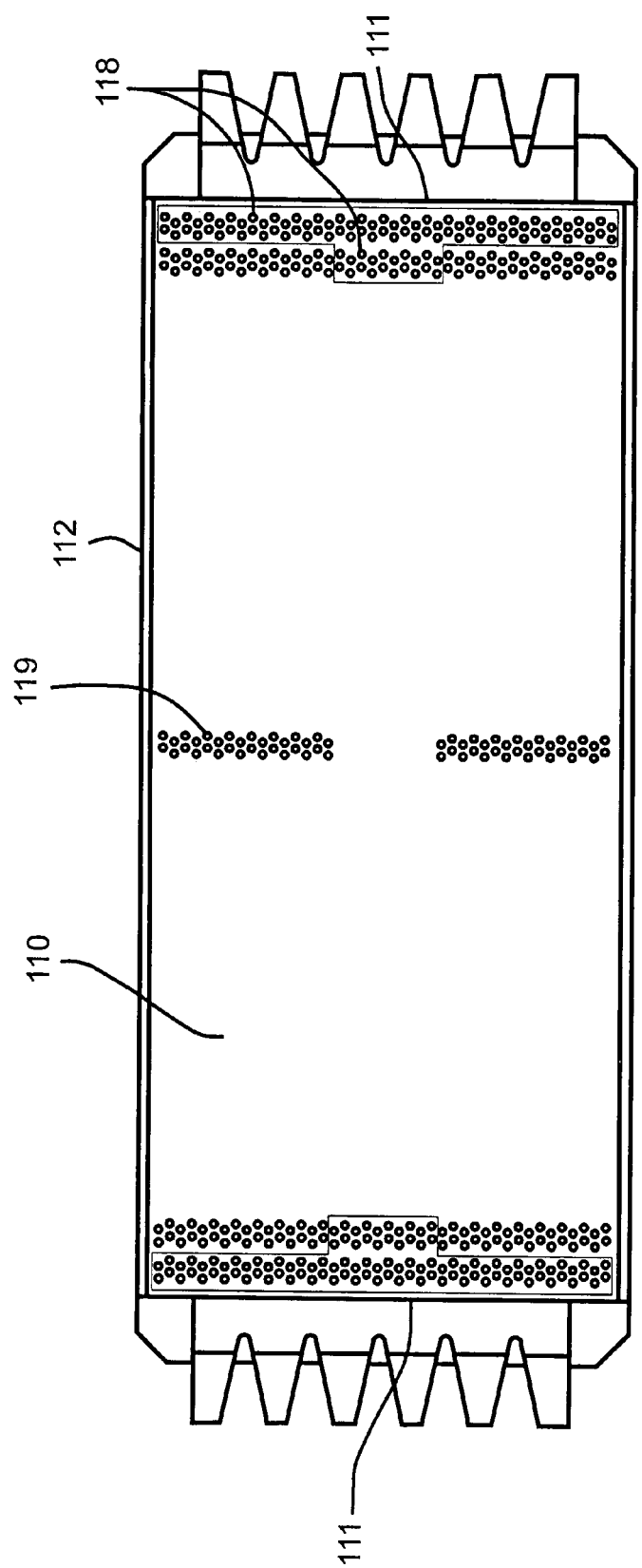
FIG. 11 is a bottom view of still another embodiment of a tip plate according to the invention.

FIG. 11 is a bottom of a tip plate 110 of a bushing having 49 pairs of rows of tips running parallel edges 111 of the tip plate 110. This tip plate, measuring about 24.016 inches by about 9.055 inches, contains about 5890 tips. The double row of tips adjacent to each edge 111 of the tip plate plus a center region of the second pair of rows of tips from the edges 111 are designated as tips 118. The remainder of the tips, interior tips, are designated 119 on this tip plate 110. When a conventional tip plate of this configuration is operated, the end tips designated 118 tend to run hotter than the interior tips 119. In the tip plate 110 of the invention, the tips 118 have a smaller ID in the range of about 0.054 to about 0.064 inch than the ID of the interior tips 119 that typically have an ID of 0.072 inch. With this configuration, FIG. 11, the fiber diameter variation under normal operating conditions is reduced to about +/−5-7 microns from nominal.

The bushings of the above examples, and other size bushings (dimensions and/or number of tips) can be modified to use either different ID's, different tip lengths, or a combination of both, to achieve the objective of reducing the fiber diameter variation of the fibers from the average fiber diameter of the fibers produced by the bushings.

Different embodiments employing the concept and teachings of the invention will be apparent and obvious to those of ordinary skill in this art and these embodiments are likewise intended to be within the scope of the claims. For example, bushings are known having only one continuous wall instead of two end walls and two sidewalls, and these bushings, usually either circular or oval or race track shape, and these bushings also be used in this invention. Also, while the sidewall has been used, and is most typical, for measuring the pressure drops of two different lengths along the bushing, an end wall can also be used, but both length portions should be between an edge of the electrical ear and the corner of the bushing nearest that edge.

The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A fiberizing bushing having at least 4000 tips for fiberizing a molten glass material through the tips to make fibers having an average fiber diameter in the range of about 16 microns, or about 13 microns, or about 10 microns or less with the variation in flow through all of the operating tips being such that the diameters of all of the fibers formed from the bushing are within the range of +/− 5-7 microns, the bushing comprising at least one wall and a tip plate having an array of 4000 or more hollow tips extending beneath the bottom surface of the tip plate, each of the tips having a channel therethrough with each channel having an interior diameter (ID), the 4000 or more tips comprising a plurality of interior tips, a plurality of extreme outer peripheral tips and a plurality of shielded tips, the latter located between the plurality of interior tips and the plurality of extreme outer peripheral tips, the ID of at least some of the tips in the extreme outer periphery having an ID that is different than the ID of at least some of the plurality of the shielded tips and at least some of the tips in the plurality of the shielded tips having an ID that is different than the ID of at least some of the interior tips such that at operating temperatures the flow of molten glass through the extreme outer peripheral tips and through the shielded tips is so similar to the flow in the interior tips such that the variation of all of the diameters of all the fibers produced from the 4000 or more tips of said fiberizing bushing is within the range of +/− 7 microns of the average fiber diameter of all the fibers.

2. The fiberizing bushing of claim 1 wherein the molten material is a molten E glass.

3. The fiberizing bushing of claim 1 wherein the at least some of the tips in the extreme outer periphery of the tip array extend a significantly greater distance from the bottom surface of the tip plate than the distance the interior tips protrude beneath the bottom surface of the tip plate.

4. The fiberizing bushing of claim 2 wherein the at least some of the tips in the extreme outer periphery of the tip array extend a significantly greater distance from the bottom surface of the tip plate than the distance the interior tips protrude beneath the bottom surface of the tip plate.

5. The fiberizing bushing of claim 1 wherein the at least some of the tips in the extreme outer periphery of the tip array extend a significantly lesser distance from the bottom surface of the tip plate than the distance the interior tips protrude beneath the bottom surface of the tip plate.

6. The fiberizing bushing of claim 2 wherein the at least some of the tips in the extreme outer periphery of the tip array protrude a significantly lesser distance from the bottom surface of the tip plate than the distance the interior tips protrude beneath the bottom surface of the tip plate.

7. The bushing of claim 1 wherein the ID of at least some of the interior tips is larger than the ID of at least some of the tips in the tips in the extreme outer periphery of the tip array.

8. The bushing of claim 2 wherein the ID of at least some of the interior tips is larger than the ID of at least some of the tips in the tips in the extreme outer periphery of the tip array.

9. The bushing of claim 3 wherein the ID of at least some of the interior tips is larger than the ID of at least some of the tips in the tips in the extreme outer periphery of the tip array.

10. The bushing of claim 4 wherein the ID of at least some of the interior tips is larger than the ID of at least some of the tips in the tips in the extreme outer periphery of the tip array.

11. The bushing of claim 1 wherein the ID of at least some of the interior tips is smaller than the ID of at least some of the tips in the tips in the extreme outer periphery of the tip array and wherein the variation of all of the diameters of all the fibers is in the range of about +/− 3-6 microns from the average fiber diameter.

12. The bushing of claim 2 wherein the ID of at least some of the interior tips is smaller than the ID of at least some of the tips in the tips in the extreme outer periphery of the tip array and wherein the variation of all of the diameters of all the fibers is in the range of about +/−3-6 microns from the average fiber diameter.

13. The bushing of claim 1 wherein at least some of the tips that are adjacent to one or more tipless spaces on the tip plate providing room for an external support or an external cooling member have a different ID and/or a different tip length than at least some of the other interior tips of the tip array.

14. The bushing of claim 2 wherein at least some tips adjacent to one or more tipless spaces on the tip plate providing room for an external support or an external cooling member have a different ID and/or a different tip length than at least some of the other interior tips of the tip array.

15. The bushing of claim 3 wherein at least some tips that are adjacent to a tipless space on the tip plate to provide room for an external support or an external cooling member have a different ID and/or a different tip length than other interior tips of the tip array.

16. The bushing of claim 4 wherein at least some tips that are adjacent to a tipless space on the tip plate providing room for an external support or an external cooling member have a different ID and/or a different tip length than other interior tips of the tip array.

17. The bushing of claim 5 wherein at least some tips that are adjacent to an external support or an external cooling member have a different ID and/or a different tip length than the other interior tips of the tip array.

18. The bushing of claim 6 wherein at least some tips that are adjacent to an external support or an external cooling member have a different ID and/or a different tip length than the other interior tips of the tip array.

19. The bushing of claim 7 wherein at least some tips that are adjacent to an external support or an external cooling member have a different ID and/or a different tip length than the other interior tips of the tip array.

20. The bushing of claim 8 wherein at least some tips that are adjacent to an external support or an external cooling member have a different ID and/or a different tip length than the other interior tips of the tip array.

21. The bushing of claim 9 wherein at least some tips that are adjacent to an external support or an external cooling member have a different ID and/or a different tip length than the other interior tips of the tip array.

22. The bushing of claim 10 wherein at least some tips that are adjacent to an external support or an external cooling member have a different ID and/or a different tip length than the other interior tips of the tip array.

23. The bushing of claim 11 wherein at least some tips that are adjacent to an external support or an external cooling member have a different ID and/or a different tip length than the other interior tips of the tip array and wherein the variation of all of the diameters of all of the fibers is in the range of about +/− 2-4 microns from the average fiber diameter.

24. The bushing of claim 12 wherein at least some tips that are adjacent to an external support or an external cooling member have a different ID and/or a different tip length than the other interior tips of the tip array and wherein the variation of all of the diameters of all of the fibers is in the range of about +/− 2-4 microns from the average fiber diameter.

25. A fiberizing bushing for fiberizing a molten glass material to make at least about 4000 fibers having an average fiber diameter in the range of about 16 microns or about 13 microns or about 10 microns or less, the bushing comprising at least one wall and a tip plate having 4000 or more orifices therein and having an array comprising 4000 or more hollow tips with each tip having a channel running through the tip, the channel having an ID and being generally aligned with an orifice in the tip plate, the tips extending beneath the tip plate, the 4000 or more tips including a plurality of extreme outer peripheral tips, a plurality of shielded peripheral tips and a plurality of interior tips, the plurality of shielded peripheral tips located on the tip plate between the plurality of interior tips and the plurality of extreme outer peripheral tips the internal diameters of the 4000 or more tips differing such that the flow of the molten glass material through all of the operating tips is so similar that only one average fiber diameter is produced and the variation all of the diameters of all of the fibers produced from said fiberizing bushing is within the range of +/− 3-6 microns from the average fiber diameter.

26. The bushing of claim 25 wherein the molten material is molten E glass.

27. The bushing of claim 25 wherein at least some of the extreme outer peripheral tips have an ID that is different than the ID of the interior tips such that the variation in the diameter of all of the fibers produced by the bushing is within a range of about +/− 2-4 microns from the average fiber diameter.

28. The bushing of claim 26 wherein at least some of the peripheral tips have an ID that is different than the ID of the interior tips such that the variation of the diameters of all the fibers produced by the bushing is within a in the range of about +/− 2-4 microns from the average fiber diameter.

29. The bushing of claim 25 wherein the length that at least some of the peripheral tips extend from the bottom surface of the tip plate is significantly different than the length that at least some of the interior tips extend from the bottom surface of the tip plate.

30. The bushing of claim 26 wherein the length that at least some of the peripheral tips extend from the bottom surface of the tip plate is significantly different than the length that at least some of the interior tips extend from the bottom surface of the tip plate.

31. The bushing of claim 27 wherein the length that at least some of the peripheral tips extend from the bottom surface of the tip plate is significantly different than the length that at least some of the interior tips extend from the bottom surface of the tip plate.

32. The bushing of claim 28 wherein the length that at least some of the peripheral tips extend from the bottom surface of the tip plate is significantly different than the length that at least some of the interior tips extend from the bottom surface of the tip plate.

33. The bushing of claim 25 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

34. The bushing of claim 26 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

35. The bushing of claim 27 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

36. The bushing of claim 28 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

37. The bushing of claim 29 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

38. The bushing of claim 30 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

39. The bushing of claim 31 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

40. The bushing of claim 32 wherein the tip plate has one or more tipless spaces to provide for one or more external supports and/or one or more tipless spaces to provide for one or more cooling members and wherein at least some of the tips adjacent to the tipless space or spaces have a resistance to flow that is significantly different than the resistance to flow of at least some of the interior tips.

41. A fiberizing bushing for fiberizing a molten material through at least about 4400 tips to make fibers having an average fiber diameter of about 16 microns, or about 13 microns or about 10 microns or less, the bushing comprising at least one wall and a tip plate having at least about 4400 orifices therein and having an array comprising at least about 4400 hollow tips with each tip having a channel running generally through the axis of the tip, each channel having an ID and being generally aligned with an orifice in the tip plate, the tips extending beneath the tip plate, the plurality of at least about 4400 tips including a plurality of extreme outer peripheral tips, a plurality of shielded peripheral tips, tips adjacent to one or more tipless spaces on the tip plate and a plurality of interior tips, the one or more tipless spaces to allow for one or more external supports and/or one or more cooling members, the configuration of the tips being such that the resistance to flow of at least some of the tips adjacent to at least one of the tipless spaces on the tip plate is so similar to the resistance to flow of at least some of the interior tips that the variation of the flow rate of molten material through all of the operating tips is such that the diameters of all of the fibers produced from said fiberizing bushing is within the range of +/− 7 microns from the average fiber diameter.

42. The bushing of claim 41 wherein the molten material is molten E glass.

* * * * *